United States Patent
Bragg

(10) Patent No.: US 11,122,345 B2
(45) Date of Patent: Sep. 14, 2021

(54) SYSTEM AND METHOD FOR CONNECTED METERING

(71) Applicant: Honeywell International Inc., Morris Plains, NJ (US)

(72) Inventor: Martin Bragg, Bracknell (GB)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/798,391

(22) Filed: Feb. 23, 2020

(65) Prior Publication Data

US 2020/0196029 A1  Jun. 18, 2020

Related U.S. Application Data

(63) Continuation of application No. 15/946,638, filed on Apr. 5, 2018, now abandoned.

(51) Int. Cl.
*H04L 29/06* (2006.01)
*H04L 29/08* (2006.01)
(Continued)

(52) U.S. Cl.
CPC ........... *H04Q 9/00* (2013.01); *G05B 19/0423* (2013.01); *H04L 29/06068* (2013.01);
(Continued)

(58) Field of Classification Search
None
See application file for complete search history.

(56) References Cited

U.S. PATENT DOCUMENTS

| 3,575,050 A | 4/1971 | Lynnworth |
| 5,386,373 A | 1/1995 | Keller et al. |

(Continued)

FOREIGN PATENT DOCUMENTS

| CN | 102143042 A | 8/2011 |
| CN | 202281632 U | 6/2012 |

(Continued)

OTHER PUBLICATIONS

Extended European Search Report dated Nov. 27, 2019 for corresponding EP Application No. 19166399.6.

(Continued)

*Primary Examiner* — Curtis A Kuntz
*Assistant Examiner* — Jerold B Murphy
(74) *Attorney, Agent, or Firm* — Ortiz & Lopez, PLLC; Kermit D. Lopez; Luis M. Ortiz

(57) ABSTRACT

A universal metering cabinet (UMC) apparatus comprises an input/output (I/O) interface configured to receive at least two data streams, each of the at least two data streams received from one of at least two sensors, and each of the at least two data streams having a different connectivity protocol. The UMC further comprises a customizable programmable interface coupled with the I/O interface and configured to convert the connectivity protocol of each of the at least two data streams into a same uniform connectivity protocol. A method comprises receiving, from the UMC, at least one data stream that includes data from at least two sensors, and receiving, from at least one server, data related to an environment around the at least two sensors. The method further comprises performing data cleansing on the data stream and the data to generate validated data and performing prognostic modeling on the validated data.

16 Claims, 6 Drawing Sheets

(51) Int. Cl.
   *G05B 19/042* (2006.01)
   *G05B 19/048* (2006.01)
   *H04Q 9/00* (2006.01)

(52) U.S. Cl.
   CPC .... *H04L 63/02* (2013.01); *G05B 2219/31369* (2013.01); *H04Q 2209/70* (2013.01)

(56) References Cited

U.S. PATENT DOCUMENTS

| | | |
|---|---|---|
| 6,480,793 B1 | 11/2002 | Martin |
| 6,646,387 B2 | 11/2003 | Discenzo |
| 6,758,277 B2 | 7/2004 | Vinegar et al. |
| 6,843,110 B2 | 1/2005 | Deane et al. |
| 7,174,783 B2 | 2/2007 | McSheffrey, Jr. et al. |
| 7,290,450 B2 | 11/2007 | Brown et al. |
| 7,373,808 B2 | 5/2008 | Zanker et al. |
| 7,557,702 B2 | 7/2009 | Eryurek et al. |
| 7,581,434 B1 * | 9/2009 | Discenzo ........... G01N 33/2888 73/53.01 |
| 7,654,151 B2 | 2/2010 | Agar et al. |
| 7,979,230 B2 | 7/2011 | Dutton |
| 8,036,788 B2 | 10/2011 | Breed |
| 8,095,640 B2 | 1/2012 | Guingo et al. |
| 8,219,214 B1 * | 7/2012 | Mimlitz ................ G05B 15/02 700/9 |
| 10,116,488 B2 | 10/2018 | Zaccaria |
| 2003/0093519 A1 * | 5/2003 | Jackson ............. G05B 19/0423 709/224 |
| 2003/0167143 A1 | 9/2003 | Turbett et al. |
| 2004/0024568 A1 | 2/2004 | Eryurek et al. |
| 2005/0011278 A1 | 1/2005 | Brown et al. |
| 2005/0164057 A1 | 7/2005 | Pospichal et al. |
| 2007/0118054 A1 | 5/2007 | Pinhas et al. |
| 2008/0127712 A1 | 6/2008 | Baker |
| 2008/0163692 A1 | 7/2008 | Huang et al. |
| 2008/0163700 A1 | 7/2008 | Huang |
| 2008/0306892 A1 | 12/2008 | Crossley et al. |
| 2010/0191481 A1 | 7/2010 | Steven |
| 2011/0010318 A1 | 1/2011 | Roverso |
| 2017/0051581 A1 | 2/2017 | Parolini et al. |
| 2017/0097617 A1 | 4/2017 | Tegnell et al. |
| 2017/0147367 A1 * | 5/2017 | Alley ................ G06F 9/44505 |
| 2017/0163444 A1 | 6/2017 | McLaughlin et al. |
| 2017/0176032 A1 | 6/2017 | Wang et al. |
| 2018/0060752 A1 | 3/2018 | Gross |

FOREIGN PATENT DOCUMENTS

| | | |
|---|---|---|
| CN | 102538912 A | 7/2012 |
| EP | 2607864 A1 | 6/2013 |
| JP | 2010043976 A | 2/2010 |

OTHER PUBLICATIONS

U.S. Appl. No. 15/946,638; Information Disclosure Statement dated Apr. 18, 2018.
U.S. Appl. No. 15/946,638; Information Disclosure Statement dated Jan. 9, 2020.
U.S. Appl. No. 15/946,638; Notice of References Cited by Examiner dated Apr. 12, 2019.
U.S. Appl. No. 15/946,638; Notice of References Cited by Examiner dated Sep. 18, 2019.
U.S. Appl. No. 15/946,638; Notice of References Cited by Examiner dated Jan. 31, 2020.
U.S. Appl. No. 15/946,638; Final Office Action, dated Jul. 28, 2020.
U.S. Appl. No. 15/946,638; Non-Final Office Action, dated Jan. 31, 2020.

* cited by examiner

SYSTEM AND METHOD FOR CONNECTED METERING

CROSS-REFERENCE TO PATENT APPLICATION

This patent application is a continuation of U.S. patent application Ser. No. 15/946,638 entitled "System and Method for Connected Metering," which was filed on Apr. 5, 2018 and is incorporated herein by reference in its entirety.

TECHNICAL FIELD

This disclosure relates generally to metering systems. More specifically, this disclosure relates to systems and methods for connected metering to provide advanced analytics and maintenance prognostics.

BACKGROUND

Industrial process control and automation systems are routinely used to automate large and complex industrial processes. These types of systems typically include meters to monitor the industrial processes and provide information to the business, for example to allow for auditing of the industrial processes and to monitor for failures in the industrial processes. Additionally, data from the meters may be used to estimate maintenance and calibration schedules of the meters of the meters themselves.

SUMMARY

This disclosure provides systems and methods for connected metering to provide advanced analytics and maintenance prognostics.

In a first embodiment, a universal metering cabinet (UMC) apparatus includes at least one input/output (I/O) interface configured to receive at least two data streams, each of the at least two data streams received from one of at least two sensors, and each of the at least two data streams having a different connectivity protocol. The UMC apparatus further comprises a customizable programmable interface coupled with the at least one I/O interface and configured to convert the connectivity protocol of each of the at least two data streams into a same uniform connectivity protocol.

In a second embodiment, a method includes receiving, at a universal metering cabinet, at least two data streams from at least two sensors, each data stream having a connectivity protocol, each data stream having a connectivity protocol. The method further includes converting, using a customizable programmable interface, the connectivity protocol of each of the received data streams into a same uniform connectivity protocol.

In a third embodiment, a method includes receiving at least one data stream that includes data from at least two sensors and receiving, from at least one server, data related to an environment around the at least two sensors. The method further includes performing data cleansing or data wrangling on the data stream and the data to generate validated data and performing prognostic modeling on the validated data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
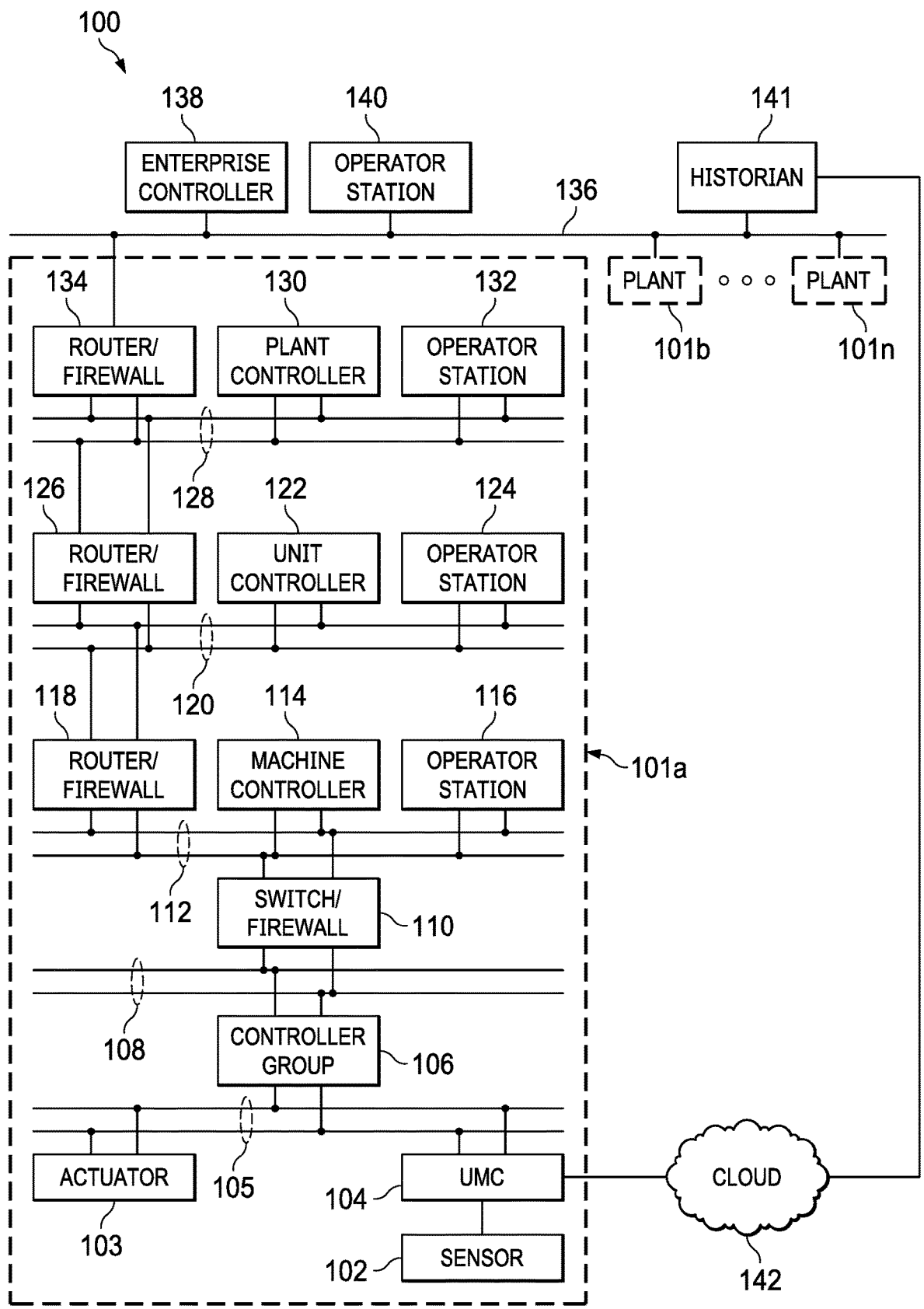
FIG. 1 illustrates an example industrial process control and automation system according to this disclosure.

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Embodiments of this disclosure contemplate that metering accuracy and reliability in industrial processes directly influences margins due to the effects on maintenance costs, process downtime, and accuracy of audits of processes. Cloud enabled connectivity across various meters (or sensors) in a system, combined with data cleansing or data wrangling (i.e., conversion of disparate data into compatible data types) allow data analysis that can enable a user to, for example, validate measurements or predict a problem in advance of a failure. Historical data and information being captured can be used as a basis to extend the calibration intervals of meters, specified by regulatory authorities, and can be used to prove near real-time condition-based uncertainty measurement to legal metrology standards. In legal metrology, measurement uncertainty is a non-negative parameter characterizing the dispersion of values attributed to a measured quantity. All measurements are subject to uncertainty, and a measurement is not considered complete until it is accompanied by a statement of associated uncertainty (e.g., + or −X %).

Embodiments of this disclosure include a connected metering solution that enables near real-time detailed data analysis for making better decisions regarding maintenance, recalibration, and reporting of mismeasurements to regulatory authorities. Relevant data is available at primary and secondary meters in the field, and a connected metering approach makes it possible to take this disparate, isolated information and make it useful. The connected metering solution regularly pulls and stores relevant raw data to provide prognostics (i.e., event prediction) with a real-time view of metering and related in-situ near real-time condition-based uncertainty. Condition based monitoring (CBM) of the meters is automated, and problems can be predicted before they occur, keeping measurement uncertainty as low as possible while improving on the typical preventative maintenance process that requires spot checks of working equipment or reactive responses to failures, both of which result in wasted resources.

Furthermore, meters or sensors are prone to data leakage, which is the unintended loss of information. Data leakage can occur when data is discarded, for example, when an employee tasked with monitoring the meter considers the data unimportant or simply does not see or record the data, or when the data is converted to a different format before it is analyzed, and the original is discarded. Data leakage can also occur when self-diagnostics capabilities of the meter or sensor are not connected, or when the data collection system is analog-based and cannot process digital protocols. A connected metering solution collects substantially all data from the meter, reducing or eliminating data leakage.

Embodiments of this disclosure contemplate using data from the connected metering solution to construct a virtual meter (or digital twin) of a physical meter. Simulation and testing can be performed on the virtual meter to analyze the condition of the meter. This enables failure prognostics and determination of calibration status for the physical meter by performing tests on a digital twin of the physical meter without having to take the physical meter offline. The data provided by the connected metering solution allows the digital twin of the physical meter to approximate the physical meter closely enough that test results on the digital twin are applicable to the physical meter.

Furthermore, embodiments of this disclosure recognize that while CBM packages provide an attempt to take a holistic approach to monitoring the system health of a metering system, such as a flow metering system, there is no standard defining CBM packages, and each installed instance of a CBM package is somewhat unique. Indeed, interpreting the data collected and reported by typical CBM packages is a job for an experienced metering engineer despite advancements towards a "traffic light" system of output that uses a scheme of red, orange, and green to indicate the condition (or health) of a meter itself. Furthermore, typical CBM packages do not provide uncertainty analysis for the meters being monitored (for example, analysis of changes in uncertainty of a flow meter's bulk flowrate). Uncertainty analysis is desirable for compliance with legal metrology standards, and because not maintaining an uncertainty budget can expose a plant operator to measurement bias errors.

There are many individual diagnostic parameters analyzed in a CBM package for which the impact of each, or the sum of a number of diagnostics, is not directly attributable to measurement uncertainty. For example, a meter's diagnostics are often influenced by fluctuations in the process in which the meter is located, and such fluctuations are not accounted for in diagnostics reporting of the meter, making it difficult to determine whether a change in the status of the meter is due to a fault in the meter or a change in the process external to the meter (whether intended or unintended). Even if a measurand is reported to the CBM that relates to a change in the metering output, it can be difficult to determine the cause of fluctuation in the metering output.

This disclosure contemplates that advanced analytics for both a meter as well as a process in which the meter is located are needed to provide condition-based uncertainty analysis for the meter, and that connected metering solutions of this disclosure are needed to provide the data for such analytics. Condition-based uncertainty analysis recognizes the influences that are typically seen at a metering point of measurement and are specific to a measuring device (i.e., a meter or sensor). For example, in an orifice meter placed into a natural gas process, influences on uncertainty include: bulk flow rate (including rate profile changes), in-use-streams (open and closed), differential pressure, temperature, pressure, composition, measurement drift or calibration interval, and test tolerances.

It is not unusual for multiple meters to be used to measure the same quantity, and measurement bias error can occur for any given sensor. A measurement bias error occurs when the source measured by the meter is biased in some way. For example, in an ultrasonic meter, a measurement bias error can occur due to build-up or fouling on wetted transducer faces of the meter. In a differential pressure meter, plugging may occur to cause a measurement bias error. In thermal devices, liquid droplets can cause heat loss to evaporation, resulting in a measurement bias error. In natural gas systems, meters are generally affected by gas density and temperature distortions (e.g., differences between the temperature profile and the velocity profile of the gas).

A connected metering system (using a UMC) combined with a CBM package to provide near real-time condition-based uncertainty analysis provides a "technical audit" of the target measurement by validating (or invalidating) the measurement. That is, it addresses the fact that when we take a measurement of a measurand, the result is not the "true" value of the measurand, but an estimate of the true value, due to the above-described uncertainty. Uncertainty analysis provides an audit of degree of certainty of the measurement, and allows a plant operator to take actions to reduce uncertainties as low as possible, for example by calibrating meters or adjusting processes. As part of this process, the near real-time condition-based uncertainty analysis provides information that can be used to perform prognostics on meters to predict failure states before they occur.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n can implement one or more processes, and the plants 101a-101n can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102 and one or more actuators 103. The sensors 102 and actuators 103 represent components in a process system that may perform any of a wide variety of functions. For example, the sensors 102 could measure a wide variety of characteristics in the process system, such as temperature, pressure, or flow rate. In addition, the actuators 103 could alter a wide variety of characteristics in the process system. The sensors 102 and actuators 103 could represent any other or additional components in any suitable process system. Each of the sensors 102 includes any suitable structure for measuring one or more characteristics in a process system. Each of the actuators 103 includes any suitable structure for operating on or affecting one or more conditions in a process system.

Universal metering cabinets (UMCs) 104 couple directly to sensors 102 to collect metering data and send it to the cloud 142 (for example, to a server within the cloud 142) for data cleansing, data wrangling, and analysis, as will be further described below. In some embodiments, UMCs 104 additionally collect environmental data relevant to the meter for use in the data analysis, such as diagnostic information from sensors 102, and information on other measurands in the system monitored by sensors 102. For example, in a gas metering system the UMC 104 could receive data from target sensors 102 that are flow meters, as well as data from each of pressure sensors, temperature sensors, and levels within the environment of the flow meters. UMCs 104 are compatible with pre-existing infrastructure and may be installed with sensors 102 that were not designed with the UMC 104 in mind. In some embodiments, one UMC 104 may be connected with multiple sensors 102, and may act as a multiplexer (MUX) to the cloud 142. The UMCs 104 additionally connect to the historian 141, described further below, such that data from the historian 141 can be combined with data from the sensors 102 for analysis.

Redundant networks 105 are coupled to the sensors 102 (via the UMCs 104) and actuators 103. The networks 105 facilitate interaction with the sensors 102 and actuators 103. For example, the networks 105 could transport measurement data from the sensors 102 and provide control signals to the actuators 103. The networks 105 could represent any suitable redundant networks. As particular examples, the networks 105 could represent redundant LEC-61850, IEC-62439, Ethernet/IP (EIP), or MODBUS/TCP networks. The networks 105 can have any suitable configuration, such as a parallel or ring topology. The networks 105 are often referred to as "industrial control" networks since these networks transport data used directly to control the underlying process system.

In the Purdue model, "Level 1" includes one or more controller groups 106, which are coupled to the networks 105. Among other things, each controller group 106 may use the measurements from one or more sensors 102 to control the operation of one or more actuators 103. Each controller in the controller groups 106 includes any suitable structure for controlling one or more aspects of a process system. As a particular example, each controller in the controller groups 106 could represent a computing device running a real-time operating system.

Redundant networks 108 are coupled to the controller groups 106. The networks 108 facilitate interaction with the controller groups 106, such as by transporting data to and from the controller groups 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC. The networks 108 are often referred to as "supervisory" networks since these networks transport data used to supervise the underlying "Level 1" controllers.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controller groups 106, sensors 102, and actuators 103, which could be associated with a particular piece of industrial equipment (such as a boiler or other machine). For example, the machine-level controllers 114 could log information collected or generated by the controller groups 106, such as measurement data from the sensors 102 or control signals for the actuators 103. The machine-level controllers 114 could also execute applications that control the operation of the controller groups 106, thereby controlling the operation of the actuators 103. In addition, the machine-level controllers 114 could provide secure access to the controller groups 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controller groups 106, sensors 102, and actuators 103).

One or more operator stations 116 are coupled to the networks 112. The operator stations 116 represent computing or communication devices providing user access to the machine-level controllers 114, which could then provide user access to the controller groups 106 (and possibly the sensors 102 and actuators 103). As particular examples, the operator stations 116 could allow users to review the operational history of the sensors 102 and actuators 103 using information collected by the controller groups 106 and/or the machine-level controllers 114. The operator stations 116 could also allow the users to adjust the operation of the sensors 102, actuators 103, controller groups 106, or machine-level controllers 114. In addition, the operator stations 116 could receive and display warnings, alerts, or other messages or displays generated by the controller groups 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controller groups 106, sensors 102, and actuators 103).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 141 is also coupled to the network 136 in this example. The historian 141 could represent a component that stores various information about the system 100. The historian 141 could, for example, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

As described above, lower-level controllers (such as Level 1 controllers in the controller groups 106) communicate with the sensors 102 and actuators 103 over one or more industrial control networks 105. The lower-level controllers also communicate with higher-level controllers or other devices/systems over one or more supervisory networks 108.

Controllers at Level 1 of the Purdue model therefore often need to communicate over multiple types of networks. For various reasons, industrial process control and automation systems often need to segregate the traffic over industrial control networks from the traffic over supervisory networks. The segregation may be needed for various reasons, such as high availability, network protocol conflict, performance, or other reasons related to the networks or the controllers. Also, it is often necessary or desirable to maintain redundancy of both networks and controllers, which helps to ensure that no single point of failure renders part of a process system unreachable. However, industrial control networks and supervisory networks often support redundancy mechanisms that are different or that conflict with one another.

In accordance with this disclosure, as described in more detail below, each controller group 106 includes redundant controllers used to segregate the industrial control and supervisory networks 105, 108. For example, each controller group 106 could include at least four controllers. At least two controllers can be connected to the industrial control networks 105 and function as redundant controllers that interact with sensors and actuators. At least two other controllers can be connected to the supervisory networks 108 and function as redundant controllers that interact with higher-level controllers. In addition, the controllers in the controller group 106 can communicate with one another using a private network. In particular embodiments, the controllers in a controller group 106 and the private network could all be located within a single cabinet, and the private network may not be addressable or accessible from any private or public network.

In this way, redundant controllers can be provided for both the supervisory and industrial control networks, helping to increase the reliability of control operations for a process system. Moreover, since different controllers are connected to different networks, segregation of network traffic can be done more easily and reliably. Further, communications between controllers can occur over a private network that can be secured, helping to ensure the reliability and security of inter-controller communications. In addition, when the controllers and private network are implemented using a common set of hardware, this can increase the ease of various functions such as spare parts management, failure/repair maintenance, installation, mounting, and power system management.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which UMCs can be used. This functionality can be used in any other suitable device or system.

Figure 2:
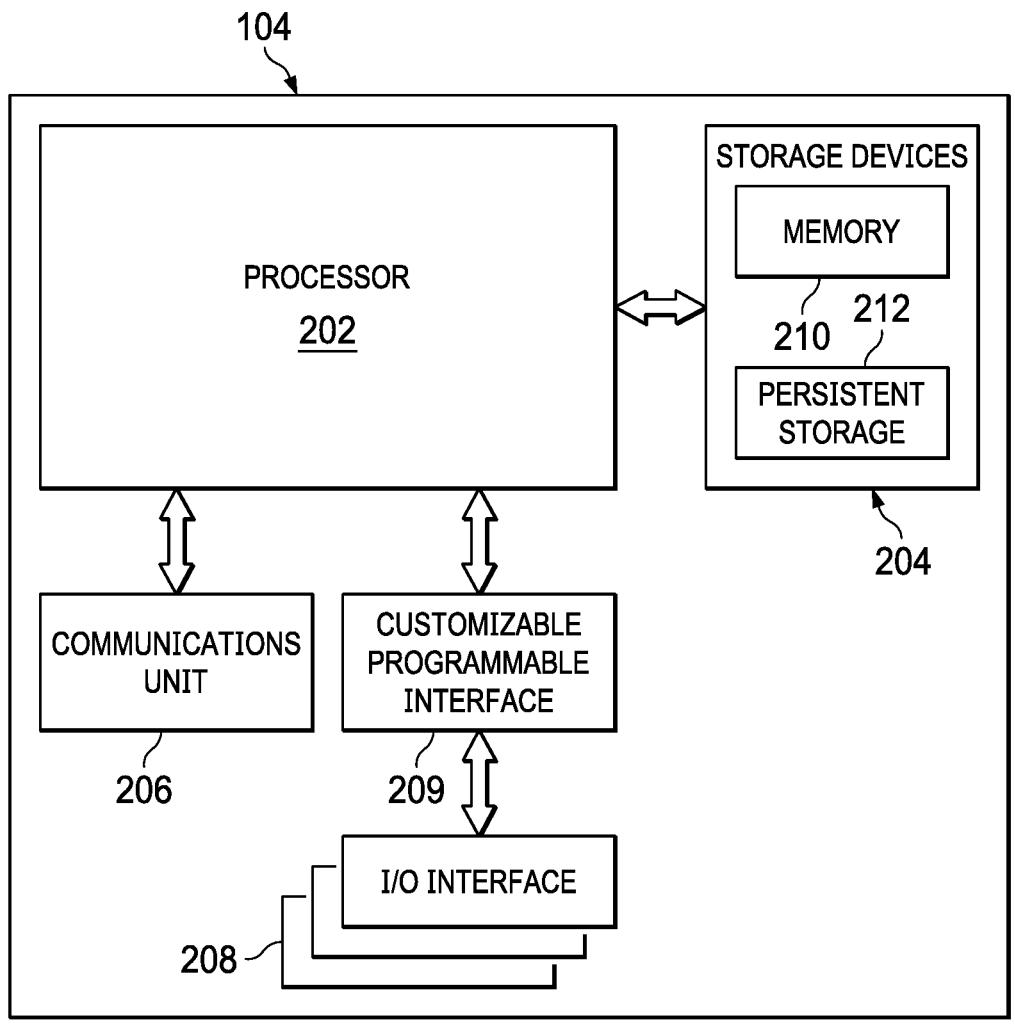
FIG. 2 illustrates an example UMC according to this disclosure.

FIG. 2 illustrates an example UMC 104 according to this disclosure. The UMC 104 could, for example, denote the UMC 104 in FIG. 1 used to implement the industrial process control and automation system 100. However, the UMC 104 could be used in any other suitable system.

As shown in FIG. 2, the UMC 104 includes at least one processor 202, at least one storage device 204, at least one communications unit 206, at least one input/output (I/O) interface 208, and at least one customizable programmable interface 209. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry. In some embodiments, the processor 202 has redundancy in the form of other processors 202.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s). For example, the communications unit 206 may facilitate communication with the cloud 142 (for example, with a server device in the cloud 142). The communications unit 206 may transmit batch data or streaming data depending on the compatibility of the cloud 142.

The I/O interfaces 208 allow for input and output of data. For example, the I/O interfaces 208 may provide for connection to meters or sensors such as sensors 102. To that end, the I/O interfaces 208 are compatible with multiple disparate data input types from disparate connectivity protocols used in sensors and meters. The I/O interfaces 208 may additionally provide a connection for user input through a keyboard, mouse, keypad, touchscreen, or other suitable input device. The I/O interfaces 208 may also send output to a display, printer, or other suitable output device. In some embodiments, one I/O interface 208 may perform the above functions.

The customizable programmable interface 209 performs various functions on one or more inputs of the I/O interfaces 208. For example, the customizable programmable interface 209 can be used to process the multiple disparate input types received through the I/O interfaces 208 and produce a single output. In this way, the customizable programmable interface 209 can facilitate multiplexing of data from various sensors and meters to an external source such as the cloud 142. Processing the multiple disparate inputs could include converting analog I/O to digital I/O, converting both analog I/O and digital I/O to a universal I/O, interpolating data, and converting data from one connectivity protocol to another connectivity protocol. For example, data interpolation could include pulse interpolation of an input from a turbine meter. In some embodiments, some or all of the functions of the customizable programmable interface 209 are performed by the processor 202.

Although FIG. 2 illustrates one example of a UMC 104, various changes may be made to FIG. 2. For example, various components in FIG. 2 could be combined, further subdivided, rearranged, or omitted and additional components could be added according to particular needs. In addition, computing devices come in a wide variety of configurations, and FIG. 2 does not limit this disclosure to any particular configuration of computing device.

Figure 3:
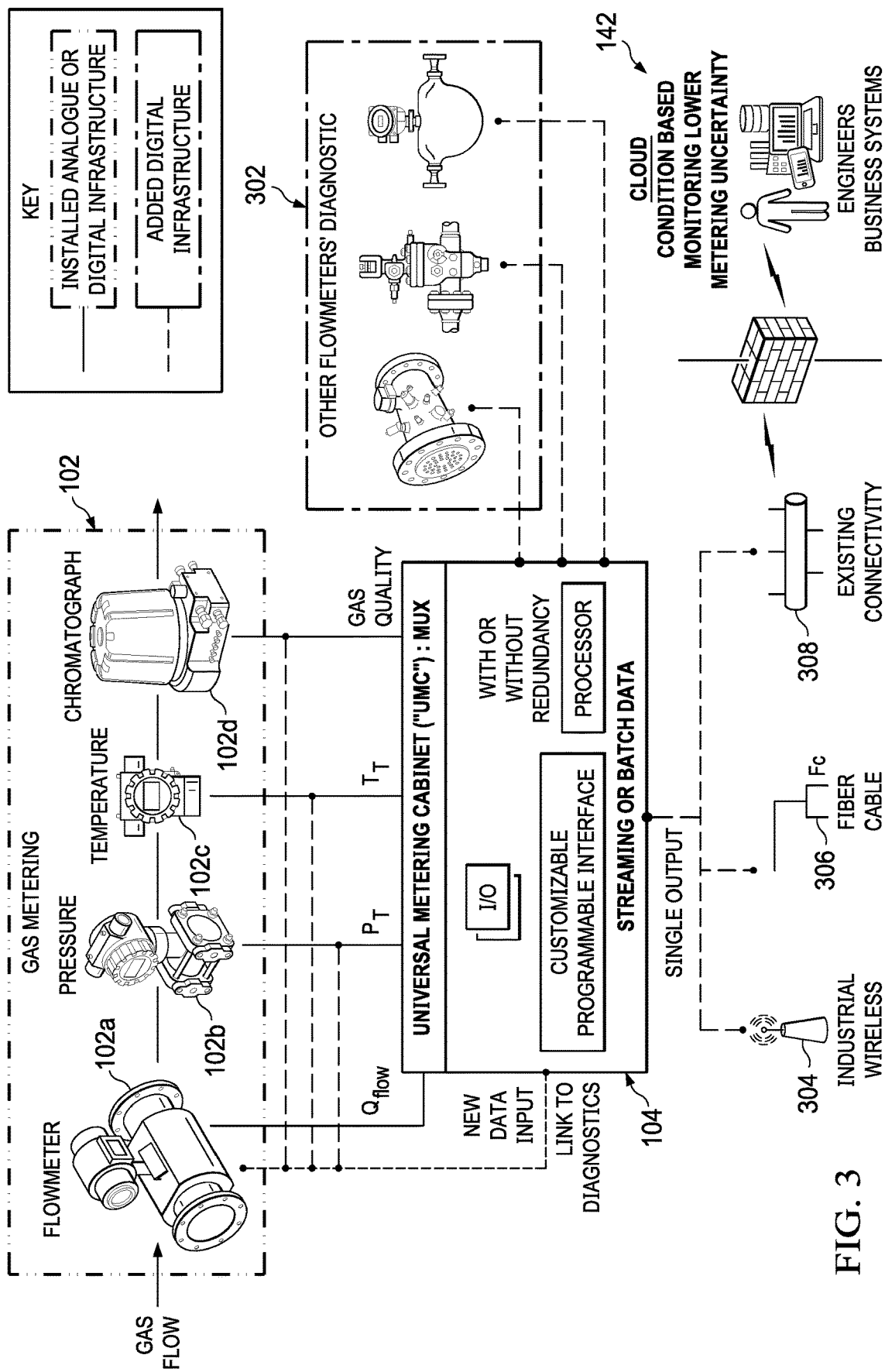
FIG. 3 illustrates an example UMC connected to a metering system according to this disclosure.

FIG. 3 illustrates an example UMC 104 connected to a metering system according to this disclosure. For ease of explanation, the UMC 104 is described as being used in the industrial process control and automation system 100 of FIG. 1. Additionally, the UMC 104 is described as being used with a gas metering system. However, the UMC 104 could be used in any other suitable system.

As shown in FIG. 3, the UMC 104 receives inputs from one or more sensors 102, which in this example are gas metering sensors. In the example of gas metering, the sensors 102 include a flow meter 102a, a pressure sensor (or meter) 102b, a temperature sensor (or meter) 102c, and a gas chromatograph 102d. In this example, the sensors 102 are pre-existing sensors installed in the industrial process control and automation system 100. That is, the sensors 102 were not necessarily designed to interface with the UMC 104. The UMC 104 is capable of receiving and interpreting the multiple disparate data types from the various sensors 102.

The UMC 104 is compatible with the disparate output types of the sensors 102, such as $Q_{low}$ of the flow meter 102a, $P_T$ of the pressure sensor 102b, $T_T$ of the temperature sensor 102c, and Gas Quality of the gas chromatograph 102d. This data could be analog or digital, depending on the meter or sensor. The UMC 104 is also able to receive additional data from the sensors 102 via new digital links to the pre-existing sensors. For example, this data could include diagnostic data from the meters or sensors 102 that is not traditionally used in analysis of the meter or sensor data. In some embodiments, the diagnostic data can be extracted from the standard outputs of the meters or sensors 102, for example using the customizable programmable interface 209 of the UMC 104, while in other embodiments the diagnostic data is received via a separate input from one or more of the meters or sensors 102. In some embodiments, the UMC 104 additionally receives data from other sensors 302 in the environment of the sensors 102. That is, the sensors 302 may be other sensors that are part of the system 100, but that are not directly interfaced with the sensors 102.

The UMC 104, after transforming the disparate data from sensors 102 and 302 into compatible data, which may be called data cleansing or data wrangling, transmits the resulting data either as a stream or in batches to the cloud 142. The data may be transmitted in various ways, such as through an industrial wireless network 304, through a fiber cable link 306, or through existing industrial connectivity links 308. Examples of industrial wireless networks 304 include WIRELESSHART, ISA 100.11a, and IEEE 802.11. Examples of existing industrial connectivity links 308 include HART, FIELDBUS, MODBUS, and OPC. This connection to the cloud may be referred to as an industrial internet of things (IIoT) gateway, as the UMC 104 may be considered part of the IIoT. In some embodiments, the transmissions are made through a secure link that includes, for example, encryption of the data before transmission to the cloud 142.

Although FIG. 3 illustrates an example UMC 104 connected to a metering system, various changes may be made to FIG. 3. For example, more or fewer sensors 102 or 302 could be connected to the UMC 104. Also, any suitable number of UMCs 104 could be used to monitor various sets of sensors 102. Furthermore, the sensors 102 that are described as gas metering sensors can measure any other fluid.

Figure 4:
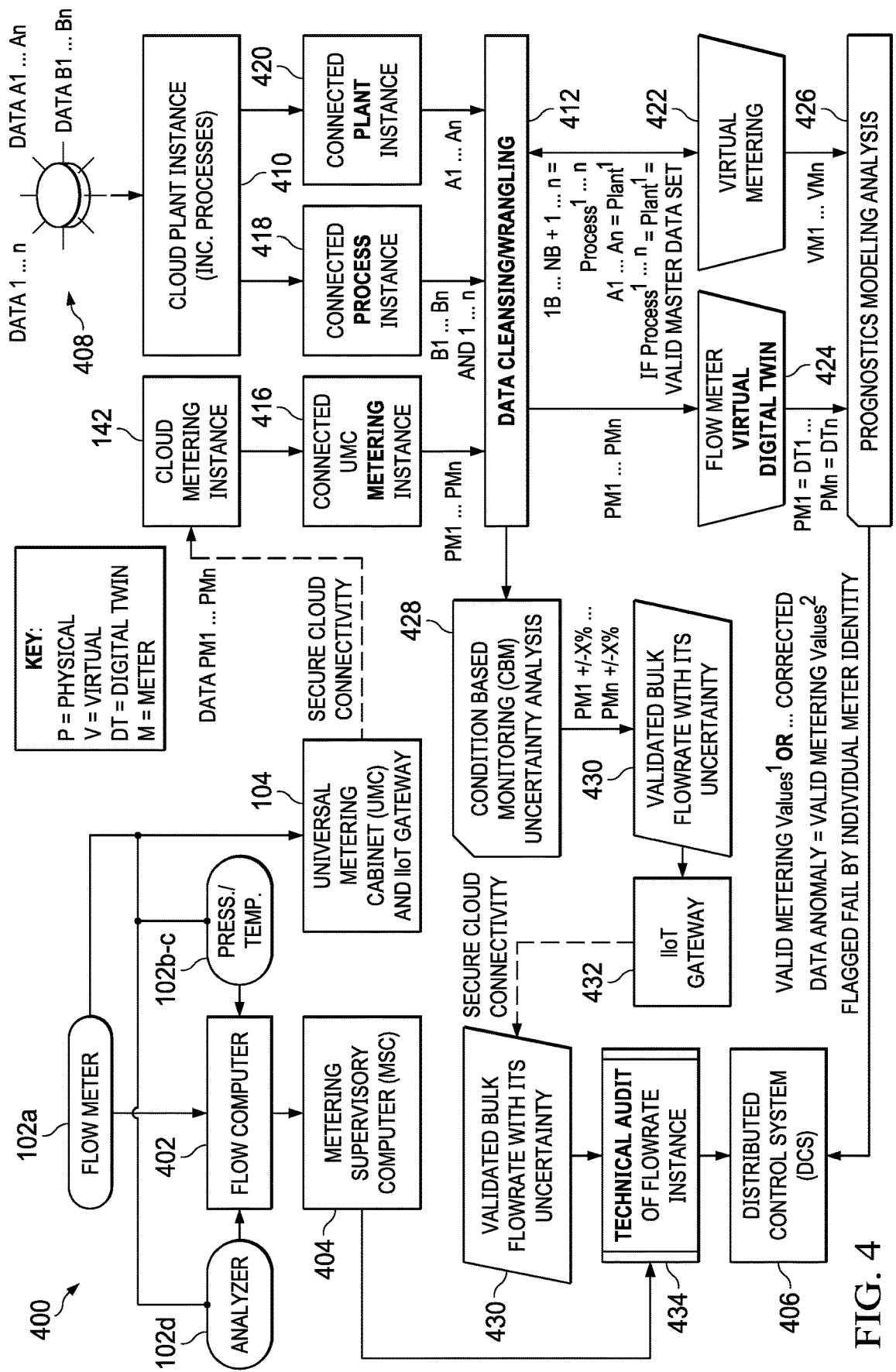
FIG. 4 illustrates an example process flow using the UMC to send data to the cloud and perform data cleansing, data wrangling, measurement validation, and prognostication according to this disclosure.

FIG. 4 illustrates an example process flow 400 using the UMC 104 to send data to the cloud and perform data cleansing, data wrangling, measurement validation, and prognostication according to this disclosure. For ease of explanation, the process flow 400 is described as being used in the system 100 of FIG. 1. The process flow 400 could be used in any other suitable system.

As shown in FIG. 4, the process flow 400 begins with a set of sensors 102 that include, in this example, a flow meter 102a, pressure sensor 102b, temperature sensor 102c, and an analyzer (such as gas chromatograph 102d, that provides fluid density or fluid composition data). The data from the sensors 102 is input to a flow computer 402, and simultaneously is captured by the UMC 104. The flow computer 402 outputs bulk flow rate through the flow meter 102a, integrated totalization over pre-defined periods of time, recording any notified alarms, and any mismeasurement events within the sensors 102.

The data from the flow computer 402 is output to a metering supervisory computer (MSC) 404, which manages data from a plurality of flow computers 402 (although only one flow computer 402 is illustrated). The MSC 404 hands over flow rate data to a distributed control system (DCS) 406 that subsequently records data in process historians (such as historian 141) and reports the data to management enterprise systems. However, condition-based uncertainty inherent in the flow meter 102a is not captured by the flow computer 402 or the MSC 404, and external validation of the integrity of the flow meter 102a is useful. The data captured by the UMC 104 can be used to perform such validation, as will be further described below.

The UMC 104 may operate as described above with respect to FIGS. 2 and 3, and may provide data through an IIoT gateway to a cloud, such as cloud 142. In this example, the cloud 142 includes the physical metering information received from the UMC 104, which includes data from the sensors 102. The data received from the UMC 104 is denoted as PM1 to PMn, and represents data from physical meters.

Additionally, data from other parts of the same plant, such as other parts of plant 101a, may be contained in disparate databases or cloud instances 408. In some embodiments, the disparate databases or cloud instances 408 include process historians such as historian 141. This data is imported into the process flow through the cloud as represented by cloud 410. In this example, data describing processes is denoted as data B1 to Bn, data related to sensors in the process flows of processes B1 to Bn (for example, sensors in other parts of plant 101a) is denoted as 1 to n, and data from the plant is denoted as A1 to An (for example, this data could correspond to expected flow parameters of processes within the plant).

The above disparate data is handled by the data cleansing or data wrangling process 412. Data cleansing (also called data scrubbing) is the process of amending or removing data in a database that is incorrect, incomplete, improperly formatted, or duplicated. Data wrangling is the process of cleaning and unifying data sets for ease of access and analysis, and can include converting or mapping data from one raw form into another format for more convenient consumption and organization of the data. In some embodiments, the data that is input to the data cleansing or data wrangling process 412 is first loaded from the clouds 142 and 410 (which may be referred to as cloud instances) into connected instances 416, 418, and 420 which represent, for example, local copies of the disparate data from the clouds 142 and 410 on a machine or machines that execute the data cleansing or data wrangling process 412.

After importing the above data, the data cleansing or data wrangling process 412 begins with understanding and documenting the data sources and their limitations, which may be referred to as compiling domain knowledge. This includes, for example, determining and documenting that data PM1 to PMn comes from the physical meters or sensors 102 within a plant 101a, that data B1 to Bn comes from other processes within a plant 101a, that data 1 to n comes from other sensors within a plant 101a, and that data A1 to An comes from plants 101a to 101n. Next, the data cleansing or data wrangling process 412 cleans up duplicate data, blank data, and other simple errors within the imported data sets. The disparate data is then combined into a single destination data type using the domain knowledge. In some embodiments the data cleansing or data wrangling process 412 then interpolates new data by calculating new fields and re-categorizing data (for example, using creative intelligence to imagine derivative variables based on the imported data). The data cleansing or data wrangling process 412 then processes the resulting data to remove outliers and "calculated-bad" results. This provides validated results.

In the example of FIG. 4, the data cleansing or data wrangling process 412 receives the disparate data sets PM1 to PMn, B1 to Bn, A1 to An, and 1 to n. The data within each disparate set are then compared to each other to determine whether simple errors exist within the data set, for example duplication of data or blanks in data. These errors are corrected, for example by removing duplicates and blanks in the data set. Disparate data sets are then combined based on their relationship to each other, such as by combining subsets of data related to a process into a master set of data for that process, and by combining data for multiple processes into a master set of data for the plant. For metering, this combination of disparate data sets includes adding or subtracting meter values and in some cases inferring data. For example, if PM1 represents a physical flow meter (such as flow meter 102a) in a process pipe that splits into two smaller streams represented by process data 1B and 2B (which may also be referred to as flow data for this process), the process can infer that 1B+2B=PM1 (i.e., that 1B and 2B are subsets of data that combine into PM1). However, in this example the relationship between 1B and 2B is not known, as there is no physical flow meter data for 1B and 2B. It is possible that the pipes related to sub-processes associated with 1B and 2B are different sizes or have other differing properties.

In order to interpolate the flow meter data for processes 1B and 2B, data is sent to the virtual meter 422. In some embodiments, the virtual meter 422 may be implemented as part of the data cleansing or data wrangling process 412, or vice versa. The virtual meter 422 is a virtual model of a meter that uses process or plant data to estimate a measurand (e.g., flow rate) where there is no physical meter in place, or to substitute for a physical meter that is taken offline (e.g., for maintenance or during a fault condition of the physical meter). That is, the virtual meter 422 allows a process to function as if a corresponding physical meter were installed in the process flow.

In one example, the virtual meter 422 applies computational fluid dynamics (CFD) to both unknowns such as 1B and 2B, and to known data, such as the physical meter data PM1, the sensor data 1 to n (which in this example represents sensor data from non-flow sensors attributed to the piping of processes 1B and 2B), and data on plant features such as the pipe geometry of the pipes associated with processes 1B and 2B. The virtual meter 422 uses CFD on this data to construct a virtual model of a flow meter for processes 1B and 2B based on the knowledge that 1B+2B=PM1. From this point, the virtual meter 422 can be used to generate the data for processes 1B and 2B. Furthermore, using the input data from the other portions of the plant, uncertainty analysis can be applied to the virtual meter 422 in the same way that it is applies to physical sensors 102, providing the process data 1B and 2B along with their associated uncertainty values.

The virtual meter 422 is used in conjunction with the data cleansing or data wrangling process 412 to fill out any missing data in the input data sets until a valid and complete "master" data set for the plant is constructed. This means that the combined data sets related to all processes of the plant (i.e., B1 to Bn and 1 to n) match with the combined data set A1 to An that represents an expected mass balancing across the plant, with associated condition-based uncertainty values. The virtual meter 422 therefore provides the benefits of a physical meter along with enhanced process validation, leveraging an autonomously self-maintaining virtual meter model that can be checked based on process or plant historian data, and other physical sensors or physical meters in the plant.

Furthermore, the physical meter data PM1 to PMn is provided by the data cleansing or data wrangling process 412 to the virtual digital twin 424. Recalling that PM1 to PMn represent data from sensors such as flow meters 102a and data from the environment around the flow meters 102a (such as the pressure sensors 102b, the temperature sensors 102c, and analyzers (or gas chromatographs) 102d, the virtual digital twin 424 is constructed based on the data PM1 to PMn to be a virtual representation of the physical flow meters such as flow meter 102a after taking the environment of the flow meters into context.

The virtual digital twin 424 is then able to provide output data DT1 to DTn that tracks the behavior of corresponding physical meters (i.e., the value of DT1 should equal PM1, DT2 should equal PM2, etc.). This output data DT1 to DTn can be used with the virtual metering data VM1 to VMn to provide prognostics modeling analysis 426. Specifically, the array of data from the data cleansing or data wrangling process 412 allows the prognostics modeling analysis 426 to make connections between previously disparate data to predict anomalies. For example, the prognostics modeling analysis 426 includes prediction of variances within data received from physical sensors 102. That is, the prognostics modeling analysis 426 cooperates with the virtual digital twin 424 to simulate "what-if" scenarios in the virtual digital twin 424, generating simulated output data that points to the corresponding physical meter (such as flow meter 102a) generating an anomaly. For example, the prognostics modeling analysis 426 can contain or receive records of valid metering values (for example, VM1 to VMn), and may compare the combination of DT1 to DTn and VM1 to VMn to determine if the combination results in valid metering values. If not, an anomaly is detected in the simulation, which predicts an anomaly in the installed system.

The prognostics modeling analysis 426 also cooperates with the virtual meter 422 to perform mass balancing between the simulated scenario of the virtual digital twin 424 (i.e., the outputs DT1 to DTn for the simulated scenario) and the output data VM1 to VMn of the virtual meter 422 to determine the source of the predicted anomaly. Outputs of the prognostics modeling analysis 426 can include an indication of a predicted anomaly and a determined source of the predicted anomaly. This could take the form of a failure flag for a particular piece of equipment, such as a meter, where the failure flag indicates that maintenance should be performed before the predicted anomaly occurs. The output of the prognostics modeling analysis 426 can also include an indication that no anomalies are predicted (i.e., that all predicted virtual meter values are valid and no anomalies are prognosticated).

The output of the prognostics modeling analysis 426 is sent to the DCS 406, enabling the DCS 406 to take action to preemptively correct for the anomaly before it occurs. Because the anomaly is predicted rather than detected after occurring, plant management is able to schedule maintenance on the source of the predicted anomaly with minimal impact on the plant.

In some embodiments, while the portion of the process that is the determined source of the predicted anomaly is taken offline for maintenance, a virtual digital twin 424 may be substituted in its place, providing continued virtual metering of the component based on the continued input of other sensors in the environment of the offline component. In this way, downtime may be avoided completely in cases where the process does not need to be shut down to take the component offline for maintenance or repairs (for example, when the repair is on a meter or sensor rather than a pipe, valve, or other component involved in processing). Once the physical component is repaired and brought back online, the outputs of the physical component can be compared to its virtual digital twin 424 to determine whether the output of the physical component is correct.

Returning to the data cleansing or data wrangling process 412, the physical meter data PM1 to PMn that was captured by the UMC 104 (from sensors such as sensor 102), as well as relevant data from the process that sensors are placed in (for example, data from historian 141 that relates to historical performance of the sensors) is sent to CBM and near real-time condition-based uncertainty analysis 428 after cleansing by the data cleansing or data wrangling process 412. CBM and near real-time condition-based uncertainty analysis 428 performs CBM and determines an uncertainty (e.g., + or −%) for the physical meter data using the supplied data. Because the physical meter data is continuously streaming (or, in some embodiments, being periodically batched) from the UMC 104, the CMB and condition-based uncertainty analysis is produced and updated in near real-time. The output of the CBM and near real-time condition-based uncertainty analysis 428 is denoted as PM1+/−X % to PMn+/−X %, which represents the physical meter data of sensor 102 with its uncertainty. Built into the uncertainty is an indication of the condition of the sensor 102. In some embodiments, a further indicator of the uncertainty (e.g., a flag that re-calibration is recommended) could be included in the output.

The output of the CBM and near real-time condition-based uncertainty analysis 428 also serves as validation of the sensor 102's output. Specifically, it indicates the condition (or health) of the sensor or sensors under review as well as how much the reading from the sensor may vary from the actual state of the measurand. If the condition of the sensor is determined to be good, and the uncertainty is below a threshold, then the resulting value (e.g., PM1+/−X %) is a validated reading of the sensor (e.g., the data PM1 captured from a sensor 102).

The validated data 430, which in this example references only flowrate data, could also include any other relevant process data. The validated data 430 is sent through an IIoT gateway 432 to a technical audit process 434 within the system that contains the sensors 102*a-d*. The technical audit process 434 also receives data from the MSC 404, described above, which represents the standard output from sensors such as the sensors 102*a-d*. The technical audit process 434 compares the relevant validated data 430 with the output of the MSC 404 to confirm whether the validated data 430 matches the output from the MSC 404. The results of the technical audit process 434 are then sent to DCS 406, allowing further review by plant personnel takes place in order to determine any appropriate actions that should be taken based on the measurements of sensors 102*a-d*.

Although FIG. 4 illustrates one example of a process flow 400 using a UMC 104 and analysis in a cloud, various changes may be made to FIG. 4. For example, various components in FIG. 4 could be combined, subdivided, or omitted and additional components could be added according to particular needs. Also, the process flow 400 could include additional sets of sensors 102 feeding into additional flow computers 402 that in turn feed into MSC 404. These additional sets of sensors 102 could connect to additional UMCs 104 that feed data into the data cleansing or data wrangling process 412 for use with CBM and near real-time condition-based uncertainty analysis 428 as well as prognostics modeling analysis 426.

Figure 5:
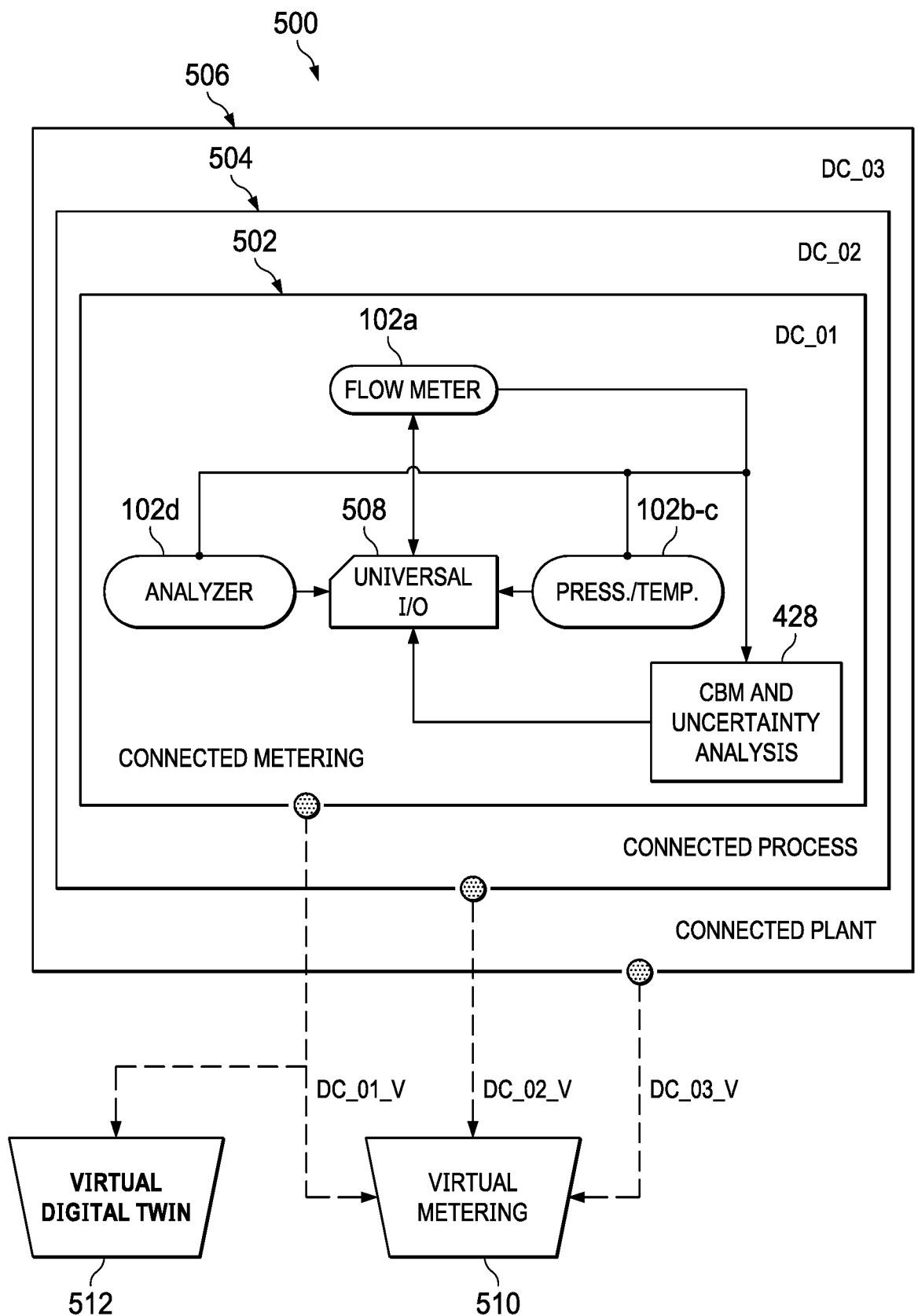
FIG. 5 illustrates a mesh connected metering ecosystem according to this disclosure.

FIG. 5 illustrates a mesh connected metering ecosystem 500 according to this disclosure. As shown in FIG. 5, the mesh connected metering ecosystem 500 is conceptually separated into nested data connectivity (DC) levels: a connected metering instance 502 (DC_01), a connected process instance 504 (DC_02), and a connected plant instance 506 (DC_03). It is understood that multiple connected metering instances 502 can be contained within a connected process instance 504, and that multiple connected process instances 504 can be contained within a connected plant instance 506.

The connected metering instance 502 represents a cloud ecosystem that includes sensors 102*a-d* that feed into a CBM and near real-time condition-based uncertainty analysis 428. The sensors 102*a-d* and the CBM and near real-time condition-based uncertainty analysis 428 all feed into a universal input/output (I/O) 508 that takes the place of the flow computer 402 and MSC 404. The universal I/O 508 connects all of the mesh connected metering ecosystem 500 together in a cloud for analysis. That is, it connects all connected metering instances 502 that are present within a plant into the mesh connected metering ecosystem 500 for the plant. The multiple connected process instances 504 and connected plant instance 506 are conceptual groupings of connected metering instances 502 within the plant. In this way, overlap between traditional remote terminal units (RTU), programmable logic controllers (PLC), supervisory control and data acquisition (SCADA), and DCS can be eliminated, simplifying and saving costs.

Data from all parts of the mesh connected metering ecosystem 500 that is collected via the universal I/O 508 is made compatible by the universal I/O in a similar manner to the data cleansing or data wrangling process 412 of FIG. 4. In some embodiments, the data cleansing or data wrangling process 412 may be implemented in the cloud of the mesh connected metering ecosystem 500 for this purpose.

Data from various parts of the mesh connected metering ecosystem 500 can be used to perform virtual metering model 510, which uses the array of data collected from different connected process instances 504 and different connected metering instances 502, and to a lesser extent from the plant instance 506, to estimate measurands in place of a physical meter such as one of sensors 102*a-d*. Similarly, data from a connected metering instance 502 can be used to create virtual digital twins 512 of any given sensor in the connected metering instance 502. The virtual metering model 510 and virtual digital twin 512 could work similarly to virtual metering 422 and virtual digital twin 424 of FIG. 4. Accordingly, the virtual metering model 510 and virtual digital twin 512 can be used to provide prognostic analysis for meters in the mesh connected metering ecosystem 500.

Figure 6:
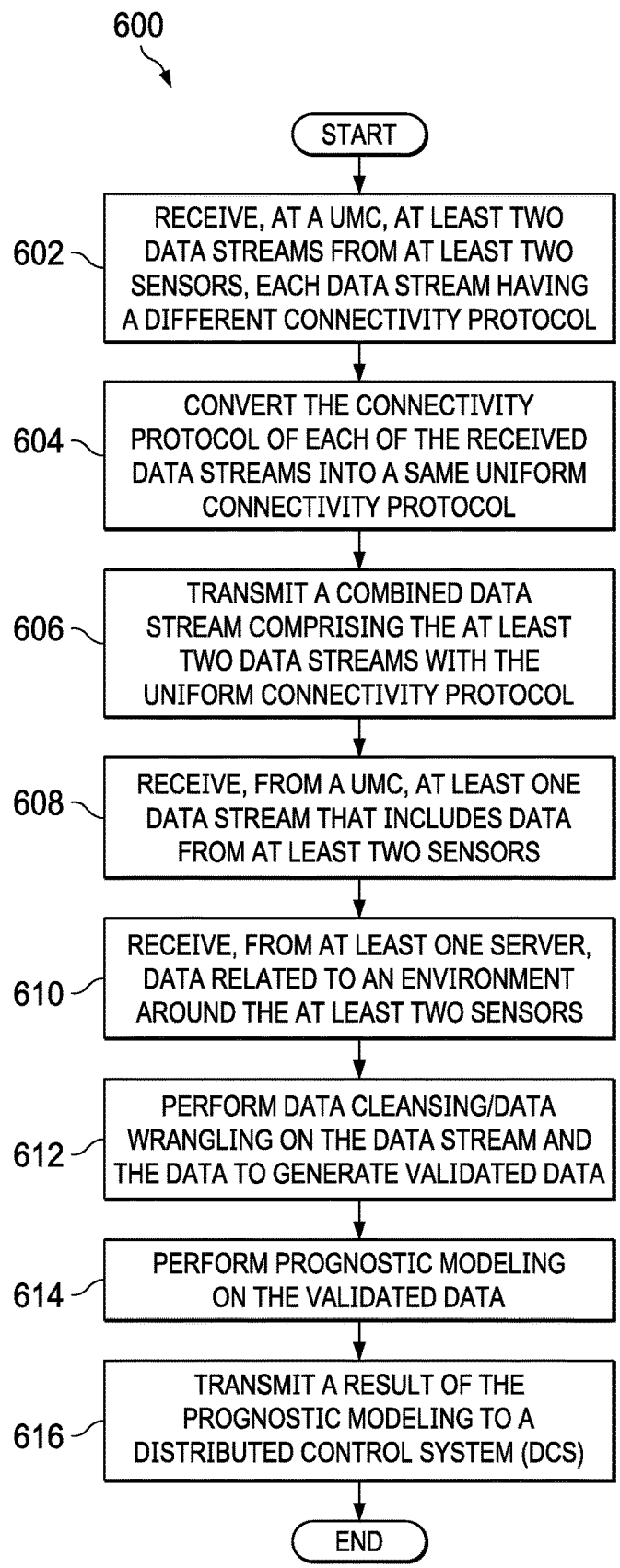
FIG. 6 illustrates an example method of a connected metering process according to this disclosure.

FIG. 6 illustrates an example method 600 of a connected metering process according to this disclosure. For ease of explanation, the method 600 is described with reference to the process flow 400 of FIG. 4. The method 600 could be used with any other suitable process flow or system.

Beginning at block 602, at least two data streams are received at a UMC, such as UMC 104, from at least two sensors, such as sensors 102*a-d*. Each of the data streams can have a disparate connectivity protocol, as described above. In some embodiments, one or more of the data streams may share a connectivity protocol. In this example, the at least two sensors are installed in the same process.

At block 604, the UMC converts the connectivity protocol of each of the received data streams into one uniform connectivity protocol. In some embodiments, the data streams are converted into a new connectivity protocol that none of them previously shared. In other embodiments, the data streams are converted into the connectivity protocol of one of the data streams. The connectivity protocol can include at least one of analog I/O, digital I/O, or a universal I/O. In some embodiments, converting the data streams into the new connectivity protocol includes performing pulse interpolation using pulses from each of the at least two data streams.

At block 606, the UMC transmits a combined data stream comprising the at least two data streams with the uniform connectivity protocol. The UMC may transmit the data stream to a cloud server, such as a server in cloud 142.

At block 608, a cloud server receives, from the UMC, at least one data stream that includes data from the at least two sensors. In some embodiments, one data stream is received from the UMC 104, and other data streams from other sensors are received from other UMCs. In some embodiments, the data streams are received from another cloud server that, in turn, receives them from the UMC or UMCs.

At block 610, the cloud server receives, from at least one other server, data related to an environment around the at least two sensors. In some embodiments, this data comes from one or more other cloud servers, and the data comprises data from the process surrounding the above at least two sensors. For example, this data could include data from sensors 302, data related to pipe geometry in the process, or the like.

At block 612, the cloud server performs data cleansing or data wrangling on the data stream received from the UMC and the data received from the other server or servers to generate validated data. Data cleansing or data wrangling includes determining a source of the at least one data stream received from the UMC (e.g., the sensors that are the source of the data) and a source of the data related to the environment around the at least two sensors (e.g., data related to the pipe geometry of the process).

Data cleansing or data wrangling further includes removing duplicate and blank data from the at least one data stream received from the UMC and the data related to the environment around the at least two sensors, and combining the data from the at least one data stream received from the UMC and the data related to the environment around the at least two sensors into combined data. In some embodiments, data cleansing or data wrangling further includes interpolating new data from the combined data and adding the new data to the combined data by calculating new fields and re-categorizing data using derivative variables based on the combined data and removing outliers and bad results from the combined data to generate validated data.

At block 614, the cloud server performs prognostic modeling on the validated data. Prognostic modeling includes simulating a metering scenario on a virtual digital twin of one of the at least two sensors to generate simulated output data that corresponds to a potential output of the one of the at least two sensors under the metering scenario. Prognostic modeling further includes determining existence of an anomaly in the simulated output data by receiving virtual sensor data from at least one virtual sensor that corresponds to the environment around the at least two sensors, and comparing the simulated output data to the virtual sensor data to determine if the simulated output data is valid.

At block 616, the cloud server transmits a result of the prognostic modeling to a distributed control system (DCS). The DCS can then use the prognostic model data to control plant processes. For example, the DCS could flag a sensor, process, or other equipment for maintenance based on an indication in the prognostic model that a failure (i.e., an anomaly) will occur.

Although FIG. 6 illustrates one example method of a connected metering process, various changes may be made to FIG. 6. For example, while FIG. 6 discusses prognostic modeling focused on a set of physical sensors within a particular process of a plant, the prognostic modeling could be performed for any number of physical sensors in the plant. Indeed, prognostic modeling could be performed for the entire plant.

In some embodiments, various functions described above are implemented or supported by a computer program that is formed from computer readable program code and that is embodied in a computer readable medium. The phrase "computer readable program code" includes any type of computer code, including source code,

What is claimed is:

1. A universal metering cabinet apparatus comprising: at least one input/output (I/O) interface configured to receive at least two data streams, each of the at least two data streams received from one of at least two sensors, and the each of the at least two data streams comprising multiple disparate input types having a different connectivity protocol, wherein the at least two data streams comprise analog data or digital data based on a type of the at least two sensors; and wherein the at least one input/output (I/O) interface is operable to receive data from the sensors via digital links; a customizable programmable interface coupled with the at least one I/O interface and configured to: transform the data from the sensors into compatible data by data cleansing or data wrangling, and process the multiple disparate input types, wherein processing the multiple disparate input types includes converting the connectivity protocol of each of the at least two data streams into a same uniform connectivity protocol, converting an analog I/O to a digital I/O, and converting both the analog I/O and the digital I/O to a universal I/O, and a communications unit coupled to the customizable programmable interface and configured to transmit to a server, a combined data stream having the same uniform connectivity protocol, wherein the customizable programmable interface is configured to multiplex the processed multiple disparate input types into the combined data stream and wherein the same uniform connectivity protocol includes the universal I/O.

2. The universal metering cabinet apparatus of claim 1, wherein the at least two sensors are each implemented in a same process.

3. The universal metering cabinet apparatus of claim 1, wherein the same connectivity protocol includes at least one of the analog I/O, the digital I/O, or the universal I/O.

4. The universal metering cabinet apparatus of claim 1, wherein the communications unit is further configured to transmit the combined data stream as batched data.

5. The universal metering cabinet apparatus of claim 1, wherein the customizable programmable interface is configured to convert the connectivity protocol of each of the received data streams into the same uniform connectivity protocol by performing pulse interpolation using pulses from each of the at least two data streams.

6. A method comprising: receiving, at a universal metering cabinet, at least two data streams, each of the at least two data streams received from one of at least two sensors, and the each of the at least two data streams comprises multiple disparate input types having a different connectivity protocol, wherein the at least two data streams comprise analog data or digital data based on a type of the at least two sensors, and wherein the at least one input/output (I/O) interface is operable to receive data from the sensors via digital links; transforming the data from the sensors into compatible data by data cleansing or data wrangling, and processing the multiple disparate input types, wherein processing the multiple disparate input types includes converting, using a customizable programmable interface, the connectivity protocol of each of the at least two data streams into a same uniform connectivity protocol, converting an analog I/O to a digital I/O, and converting both the analog I/O and the digital I/O to a universal I/O: and transmitting, to a server using a communication unit coupled to the customizable programmable interface, a combined data stream comprising the at least two data streams, the combined data stream having the same uniform connectivity protocol, wherein the customizable programmable interface is configured to multiplex the processed multiple disparate input types into the combined data stream and wherein the same uniform connectivity protocol includes the universal I/O.

7. The method of claim 6, wherein the same connectivity protocol includes at least one of the analog I/O, the digital I/O, or the universal I/O.

8. The method of claim 6, wherein the at least two sensors are each implemented in a same process.

9. The method of claim 6, further comprising performing pulse interpolation using pulses from each of the at least two data streams.

10. The method of claim 6, further comprising transmitting the combined data stream as batched data.

11. A universal metering cabinet apparatus, comprising: at least one input/output (I/O) interface configured to receive at least two data streams, each of the at least two data streams received from one of at least two sensors, and the each of the at least two data streams comprises multiple disparate input types having a different connectivity protocol, wherein the at least two data streams comprise analog data or digital data based on a type of the at least two sensors, and wherein the at least one input/output (I/O) interface is operable to receive data from the sensors via digital links; a customizable programmable interface coupled with the at least one I/O interface and configured to: transform the data from the sensors into compatible data by data cleansing or data wrangling, and process the multiple disparate input types, wherein processing the multiple disparate input types includes converting the connectivity protocol of each of the at least two data streams into a same uniform connectivity protocol, converting an analog I/O to a digital I/O, and converting both the analog I/O and the digital I/O to a universal I/O; and a communications unit coupled to the customizable programmable interface and configured to transmit, to a server, a combined data stream as batched data comprising the at least two data streams, the combined data stream having the same uniform connectivity protocol, wherein the customizable programmable interface is configured to multiplex the processed multiple disparate input types into the combined data stream and wherein the same uniform connectivity protocol includes the universal I/O.

12. The universal metering cabinet apparatus of claim 11, wherein the customizable programmable interface is configured to convert the connectivity protocol of each of the received data streams into the same uniform connectivity protocol by performing pulse interpolation using pulses from each of the at least two data streams.

13. The universal metering cabinet apparatus of claim 11, wherein the same connectivity protocol includes at least one analog I/O.

14. The universal metering cabinet apparatus of claim 11, wherein the same connectivity protocol includes at least one digital I/O.

15. The universal metering cabinet apparatus of claim 11, wherein the same connectivity protocol includes at least one of: the analog I/O, the digital I/O, and the universal I/O.

16. The universal metering cabinet apparatus of claim 11, wherein the at least two sensors are each implemented in a same process.

* * * * *